Oct. 3, 1939.  H. GOODACRE  2,174,826
LAWN MOWER
Filed June 16, 1938  2 Sheets-Sheet 1
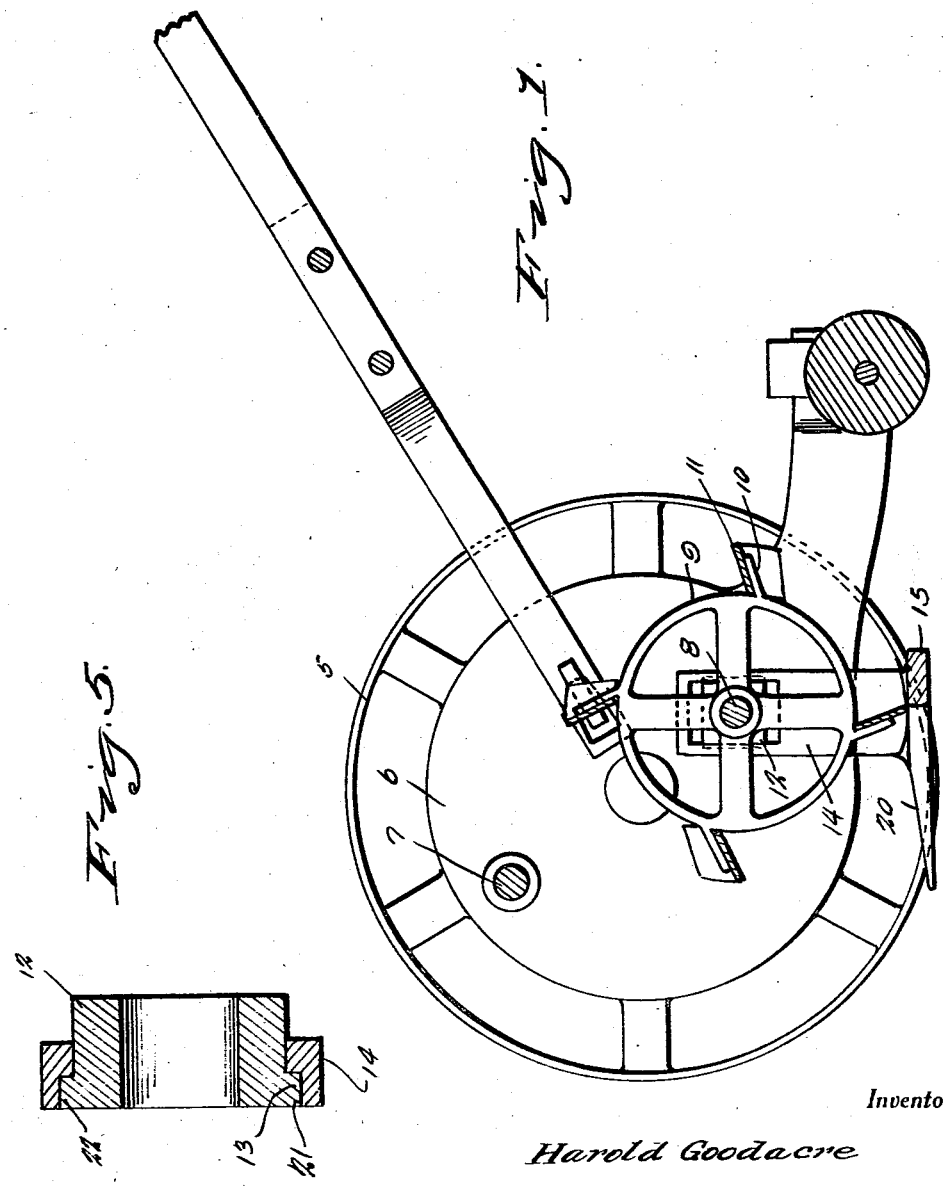
Inventor
Harold Goodacre
By Clarence A. O'Brien
and Hyman Berman
Attorneys Oct. 3, 1939.  H. GOODACRE  2,174,826
LAWN MOWER
Filed June 16, 1938   2 Sheets-Sheet 2
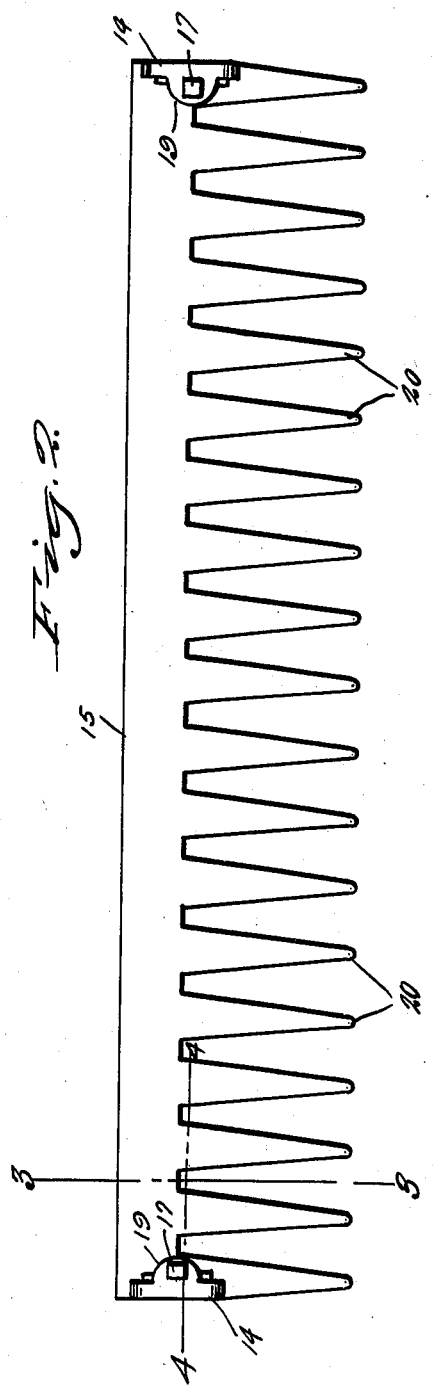
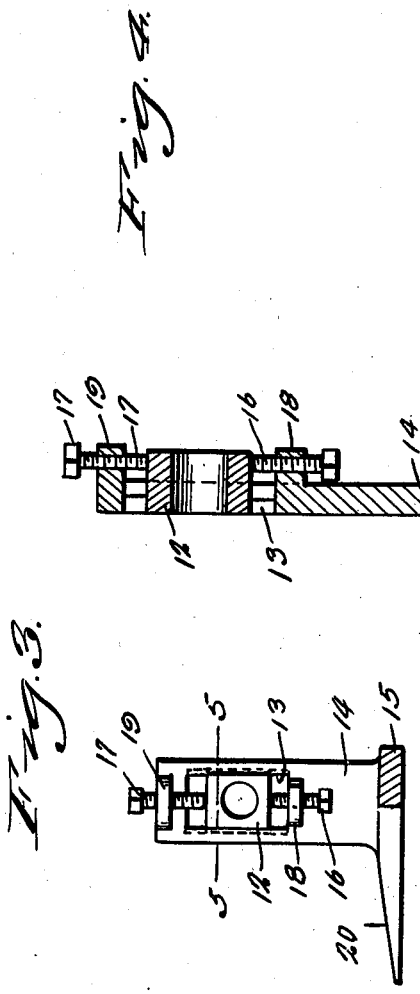
Inventor
Harold Goodacre
By Clarence A. O'Brien
and Hyman Berman
Attorneys Patented Oct. 3, 1939

2,174,826

UNITED STATES PATENT OFFICE 2,174,826

LAWN MOWER

Harold Goodacre, Newport, R. I.

Application June 16, 1938, Serial No. 214,135

1 Claim. (Cl. 56—294)

This invention appertains to new and useful improvements in cutting apparatus and more particularly to a lawn mower.

The principal object of the present invention is to provide a lawn mower employing a cutting reel as the cutting medium thereof.

Another important object of the invention is to provide a lawn mower employing a grass combing bar with which a cutting reel is cooperative for cutting grass in a more even and efficient manner.

These and other important objects and advantages of the invention will become apparent to the reader of the following specification.

In the drawings:

Figure 1 represents a vertical sectional view through a lawn mower.

Figure 2 is a top plan view of the comb bar.

Figure 3 is a section on the line 3—3 of Figure 2.

Figure 4 is a section on the line 4—4 of Figure 2.

Figure 5 is a section on the line 5—5 of Figure 3.

Referring to the drawings wherein like numerals designate like parts, it can be seen in Figure 1, that numeral 5 represents one of the usual wheels of a lawn mower while numeral 6 represents the usual gear box, these boxes being braced in the usual manner by a bar or bars 7.

The numeral 8 represents the cutter driving shaft having its ends disposed into the gear boxes and on this shaft, in carrying out the present invention, is a cutting reel 9. This reel being provided with substantially tangential flanges 10 to which the cutter blades 11 are suitably secured.

On each of the gear boxes 6 is a bearing block of substantially square shape and denoted by numeral 12 and this projects through the rectangular-shaped slot 13 of the corresponding riser 14. A riser 14 is located on each end of the comb bar 15. The block 12 is bored to receive the corresponding end of the drive shaft 8 and adjusting screws 16 and 17 are adapted to be driven against the under and top sides thereof for the purpose of accurately adjusting the comb bar 15.

Each of the risers 14 has a lug 18 below the opening 13 and a lug 19 at the upper end of the opening 13 and these lugs are formed with threaded bores for receiving the screws 16 and 17.

The comb bar 15 is provided with forwardly extending fingers 20 of forwardly tapering construction.

As can be seen in Figure 5, the inner vertical edge portions of the risers 14 at the opening 13 are rabbeted as at 21 for accommodating the lateral rib portion 22 of the bearing block 12.

Thus with the structure shown in Figures 3 and 4, the comb bar 15 can be adjusted upwardly or downwardly in the proper relation desired with respect to the cutter blades 11 of the reel 9.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A cutter bar for reel type lawn mowers comprising an elongated bar having a top portion with which the reel is cooperative when cutting, the lead edge of said bar having a plurality of comb teeth extending forwardly therefrom constructed and arranged to guide material to a position for cutting, and means for vertically adjusting said bar, said means consisting of risers at the ends of the bar and a bearing block slidably mounted on the upper portion of each riser, and upwardly and downwardly feedable screws below and above the said bearing blocks and arranged to hold the bar in proper adjusted position.

HAROLD GOODACRE.